United States Patent [19]

Yates

[11] 4,074,886
[45] Feb. 21, 1978

[54] HEIGHT ADJUSTMENT MECHANISM FOR A VEHICLE SEAT

[75] Inventor: Brian Yates, Bozeat, England

[73] Assignee: UOP Inc., Des Plaines, Ill.

[21] Appl. No.: 775,077

[22] Filed: Mar. 7, 1977

[51] Int. Cl.² .......................................... F16M 11/24
[52] U.S. Cl. .................................. 248/394; 248/396; 248/373
[58] Field of Search ............... 248/396, 397, 394, 382, 248/373

[56] References Cited

U.S. PATENT DOCUMENTS

| | | | |
|---|---|---|---|
| 3,147,945 | 8/1964 | Leslie et al. | 248/394 |
| 3,525,496 | 8/1970 | Colautti et al. | 248/394 |
| 3,669,398 | 6/1972 | Robinson | 248/394 |
| 3,692,271 | 9/1972 | Homier et al. | 248/394 |

FOREIGN PATENT DOCUMENTS

| | | | |
|---|---|---|---|
| 2,278,526 | 2/1976 | France | 248/394 |
| 2,419,988 | 11/1975 | Germany | 248/394 |
| 528,081 | 10/1940 | United Kingdom | 248/394 |
| 1,271,869 | 4/1972 | United Kingdom | 248/396 |

Primary Examiner—Marion Parsons, Jr.
Attorney, Agent, or Firm—James R. Hoatson, Jr.; Barry L. Clark; William H. Page, II

[57] ABSTRACT

A vehicle seat has a seat cushion frame supported on a seat frame by height adjustment mechanisms located at the front and rear of the seat. The rear height adjustment mechanism comprises a hinge plate pivoted at opposite ends to the seat frame and to the rear edge of the seat cushion frame, a rack pivoted to the seat frame and formed with vertically spaced slots, and a locking pin carried by the hinge plate and engageable in any selected one of the slots. The rack is movable by a handle out of engagement with the locking pin to release the seat cushion frame for upward movement under the force of a biasing spring or for down movement under the load of the seat occupant. Release of the handle engages the locking pin with the slot of the rack lying nearest opposite it to lock the adjustment mechanism.

6 Claims, 4 Drawing Figures

HEIGHT ADJUSTMENT MECHANISM FOR A VEHICLE SEAT

This invention relates to a vehicle seat incorporating a mechanism for adjusting the height of a seat cushion frame relative to a seat frame. The seat cushion and seat cushion frame are sometimes referred to as a seat squab.

Height adjusting mechanisms are known which permit the front and rear portions of a seat cushion frame to be raised or lowered independently relative to a seat frame.

Many simple forms of such a height adjustment mechanism comprise a pin and slotted plate coupling, in which the pin, fixed for example to the frame of the seat cushion, is movable into any selected one of a plurality of vertically-spaced slots in the plate which is fixed to the seat frame. This method of height adjustment however involves manual displacement of the seat cushion frame in the fore-and-aft direction and is seldom convenient in operation, since it usually requires the seat occupant to leave the seat and use both hands to make the adjustment.

It is also known from U.S. Pat. No. 3,870,269 Werner et al) to provide a seat height adjustment mechanism in which a seat cushion frame is supported above a seat frame by a first link arm having a fixed pivot connection to the seat cushion frame and a horizontally-sliding pivot connection with the seat frame, and a second link arm having fixed pivot connections to the seat frame and to the first link arm. The sliding pivot connection in this case incorporates a rack and a detent tooth carried by the first link for engagement with a selected tooth of the rack. In such a height adjustment mechanism, a very heavy load is carried by the detent tooth, rack teeth and sliding pivot connection, and a heavy duty construction is required to withstand the wear resulting from such a heavy load. All these factors increase the cost of the construction.

Moreover, the operating handle which is connected to the detent tooth must move horizontally with variation of seat height, and such movement can easily become obstructed in the confined space of a truck or other road vehicle. Furthermore a translationally movable handle beneath a seat can be difficult for the seat occupant to locate.

An object of the present invention is to provide a seat height adjustment mechanism which is of simple and low cost construction and is easy for the seat occupant to operate.

According to the present invention there is provided a vehicle seat comprising, a seat frame, a seat cushion frame, two cushion-height adjustment mechanisms mounted on the seat frame at the front and back of the seat respectively and supporting the front and back of the seat cushion frame for independent movement upwards and downwards with respect to the seat frame, one of the said height adjustment mechanisms comprising hinge means pivoted to the seat frame and to the seat cushion frame respectively on horizontally-spaced parallel pivots extending laterally of the seat, to allow the cushion frame to be raised or lowered pivotally, a spring mounted on the seat frame and biassing the hinge means upwardly, two cooperating locking means comprising a pin, and a rack having teeth spaced apart vertically to receive the pin therebetween in vertically downward load-supporting relationship, means mounting one of said locking means on the seat frame, means mounting the other of said locking means on the hinge means and cushion frame assembly, one of the mounting means being a pivot on which the associated locking means is supported, and biassing means acting on the pivotally supported locking means to urge the two locking means into mutual engagement.

Conveniently, the hinge means comprise a plate hinged along its forward and rearward edges to the seat cushion frame and to the seat frame respectively and the rack is formed by a plate having a generally vertically extending main slot therein and a plurality of laterally-extending vertically-spaced branch slots defining between them the teeth of the rack. Preferably the rack is pivoted adjacent one end thereof to the seat frame, and the pin is fixed to the hinge means.

One embodiment of the invention will now be described in detail, by way of example only, with reference to the accompanying drawings in which.

Figure 1:
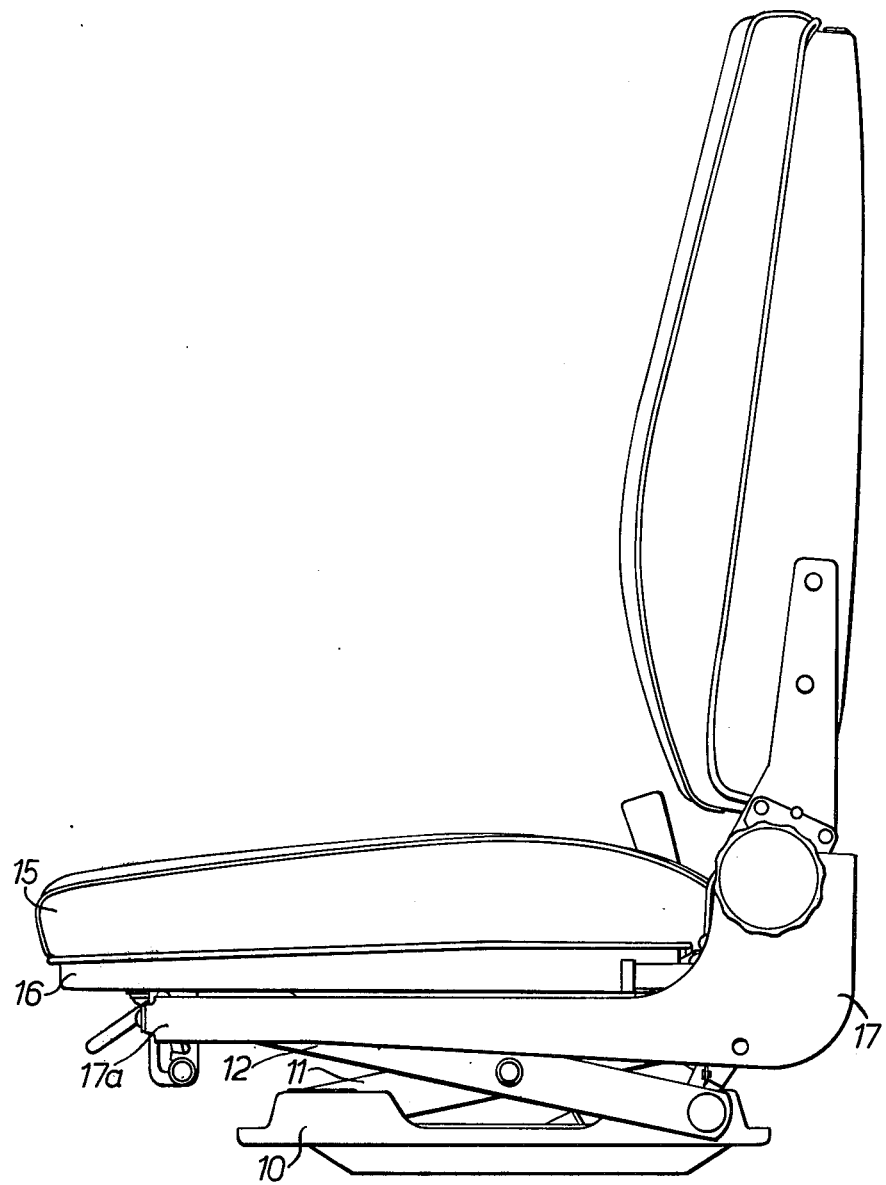
FIG. 1 is a side elevation of a vehicle seat incorporating seat height adjustment mechanisms.
Figure 2:
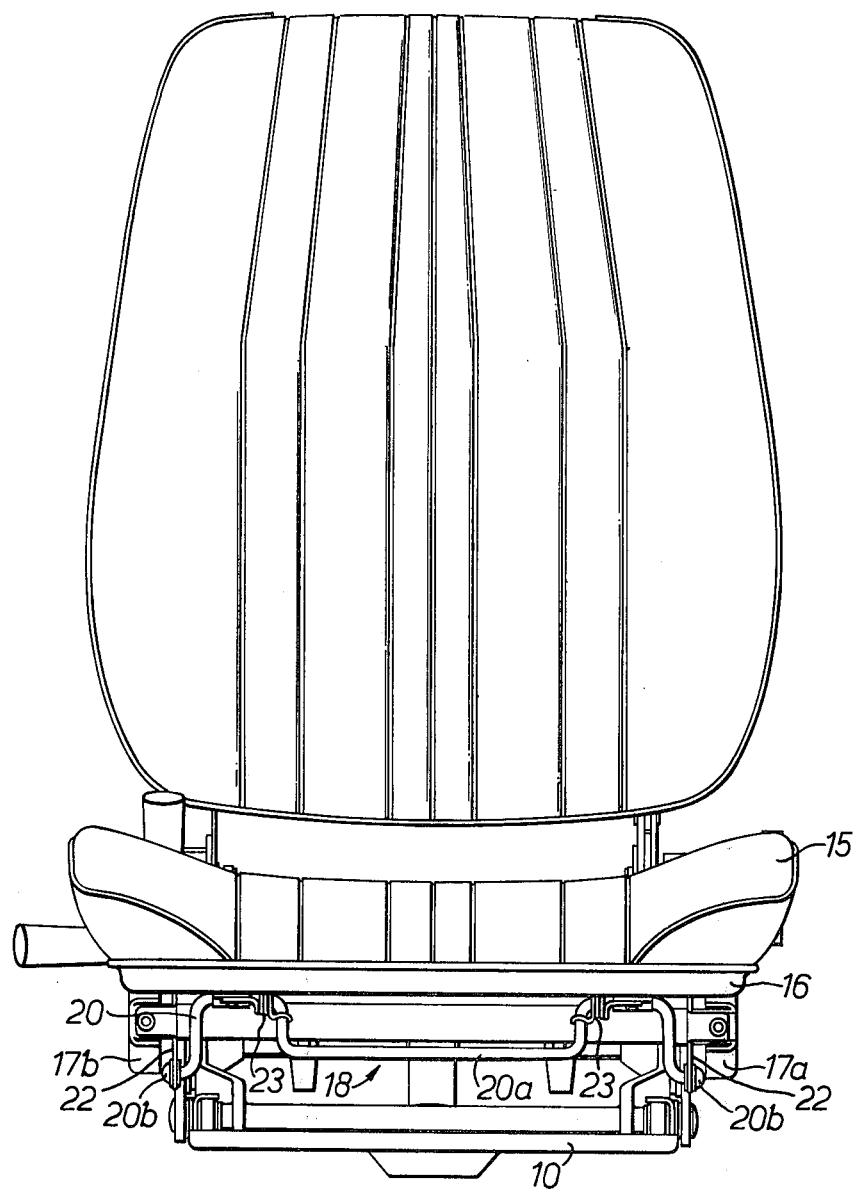
FIG. 2 is a front elevation of the seat of FIG. 1.
Figure 3:
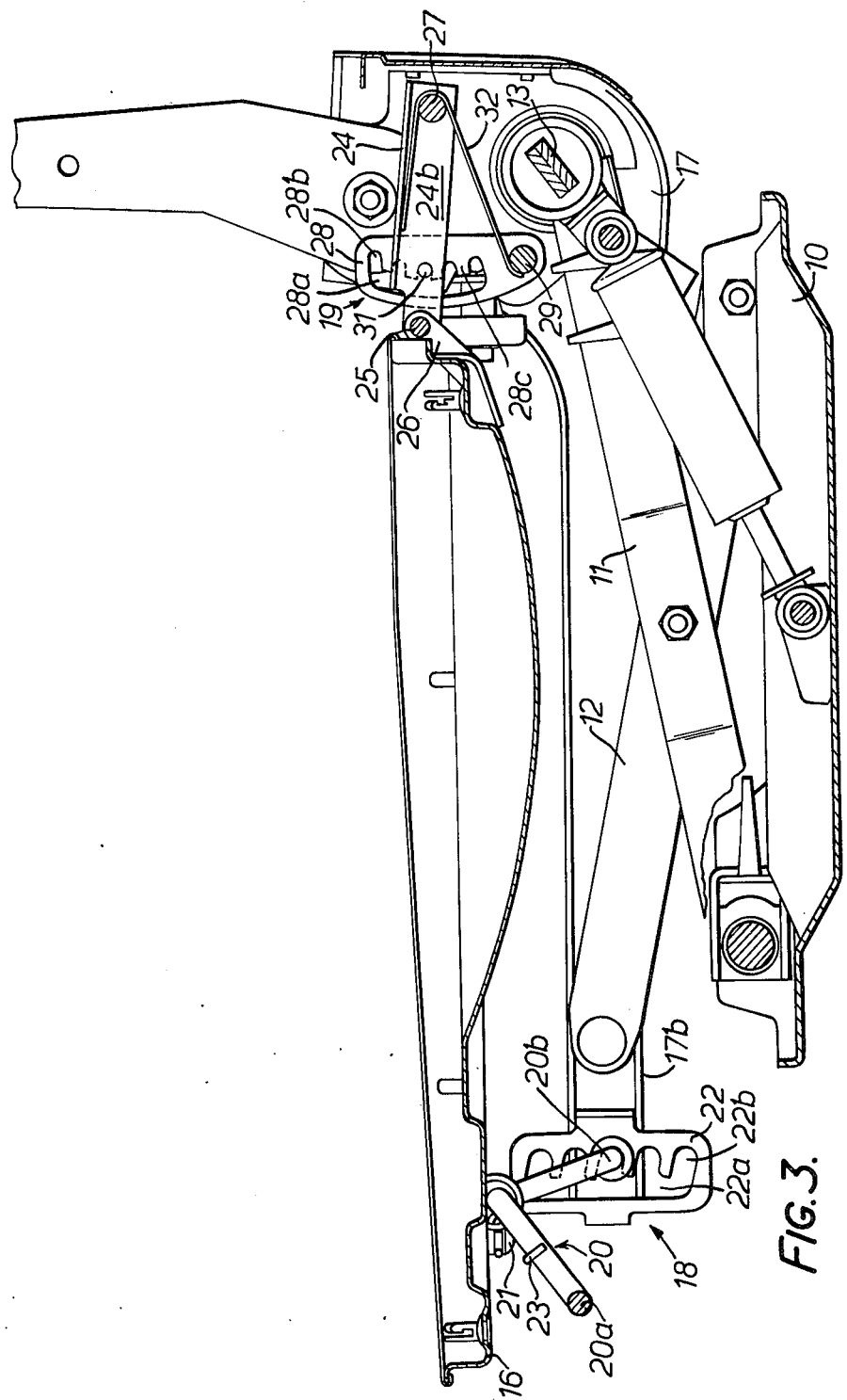
FIG. 3 is a longitudinal section through the seat of FIG. 1 after removal of the seat cushion and back support.
Figure 4:
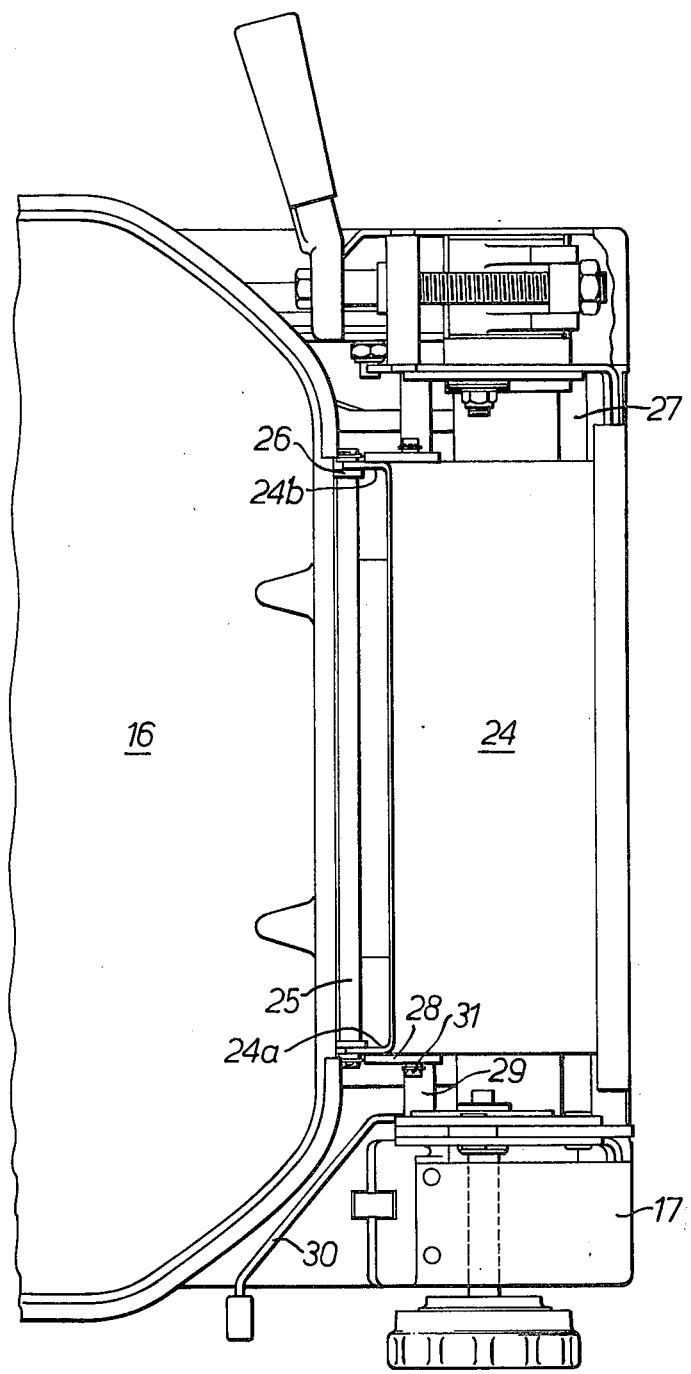
FIG. 4 is a plan view of the rearward part of the seat seen in FIG. 3.

The seat shown in the drawings broadly comprises a base frame 10 on which a seat frame 17 is supported by a spring suspension consisting of two laterally spaced pairs of pivotally-interconnected linkage arms 11, 12 having pivoted connections at their opposite ends to the base frame and the seat frame respectively (two pivoted connections on each pair of arms being sliding connections) and a torsion bar spring 13 acting between one linkage arm of each pair and the seat frame to bias the seat frame upwardly. These features are all described in the assignees U.S. Pat. No. 3,774,963 and British Patent Specification No. 1,271,869, to which attention is directed for further details of their construction, but these features form no part of the present invention. The British Patent Specification also describes forms of height adjustment mechanism supporting a seat cushion and seat cushion frame on the seat frame at the front and back of the seat and permitting independent height adjustment of the front and back of the seat cushion.

the present invention is concerned with an improved seat height adjustment mechanism, an example of which is shown in detail in FIGS. 3 and 4 hereof. Accordingly the only parts of the seat which are significant to the present invention are the seat cushion 15, seat cushion frame 16, seat frame 17 having opposite side members 17a, 17b and forward and rearward height adjustment mechanisms 18, 19.

The forward height adjustment mechanism 18 (which is substantially as described in the above mentioned British Patent Specification) comprises a cranked bar 20 pivoted to the seat cushion frame by hinge straps 21. The central portion of the cranked bar forms a handle 20a and the offset end portions of the bar form laterally extending pins 20b which engage in vertically-extending rack plates 22 fixed to the side members 17a, 17b of the seat frame 17. Coil springs 23 acting between the cranked bar 20 and the seat cushion frame 16 urge the pins rearwardly to engage in the intertooth spaces of the rack plate. These spaces are formed by branch slots 22b which extend rearwardly and downwardly from a main vertical slot 22a of each rack. Thus by grasping the front of the seat cushion frame in the hand of the seat occupant and lifting it, the pins 20b will ratchet from one branch slot to the next. However before lowering the front of the seat cushion frame, it is necessary first to lift the handle to withdraw the pins 20b from the branch slots 22b.

The rearward height adjustment mechanism 19, to which the present invention particularly relates, comprises a hinge plate 24 having side flanges 24a, 24b. A hinge pin 25 is fixed at its opposite ends in the forward ends of flanges 24a, 24b and extends through hinge brackets 26 fixed to the rearward end of the seat cushion frame thereby pivoting the hinge plate to the seat cushion frame. A second hinge pin 27 extending between the rear ends of flanges 24a, 24b is journalled at its opposite ends in the seat frame 17.

A rack is formed by two rack plates 28 disposed vertically alongside the opposite flanges 24a, 24b of the hinge plate, the rack plates being fixed to a pivot shaft 29 whose opposite ends are journalled in the seat frame 17, one end of the shaft supporting an operating handle 30.

Each rack plate contains a main vertically-extending slot 28a and a plurality of branch slots 28b between which the teeth 28a of the rack are defined. A locking pin 31 extends laterally outwards from each flange 24a, 24b of the hinge plate for engagement in selected branch slots 28b of the rack plate.

Each rack plate is biassed by the weight of the handle 30 and if required by an assisting spring (not shown) into engagement with the respective pin 31 of the hinge plate.

A V shaped leaf spring 32 passes around the rear hinge pin 27 and bears at its opposite ends on the underside of the hinge plate 24 and on the pivot shaft 29 to bias the hinge plate in an upward direction.

In operation of the rear height adjustment mechanism, the seat occupant, when wishing to raise the height of the rear part of the seat cushion, will raise the handle 30 to disengage each locking pin 31 from its associated rack plate 28 and will lift his weight from the seat. As a result, the rear part of the seat cushion will pivot upwards under the biassing force applied by spring 32 via the hinge plate 24 to the seat cushion frame 16.

When the seat cushion has reached the desired height, limited by the length of the main slot 28a of the rack plate, release of the handle will allow the weight of the handle, and the bias of any assisting spring, to engage each locking pin 31 with the nearest branch slot 28b of its associated rack plate to lock the height adjustment mechanism.

To lower the height of the rear end of the seat cushion, the seat occupant will lift the handle to disengage each locking pin 31 and the weight of the seat occupant will depress the seat cushion to the desired height, limited by the length of slot 28a, whereupon release of the handle will again lock the height adjustment mechanism.

It will be evident that the force of the leaf spring 32 will be chosen to be substantially greater than that needed to balance the load of the seat cushion and its frame when the seat is unoccupied, but substantially less than that needed to balance the load when the seat is occupied by a person of average weight. Accordingly the static load carried by the height adjustment mechanism will normally be substantially less than the average weight of a seat occupant.

Although the rear seat height adjustment mechanism has been described as comprising two laterally spaced rack plates, it will be evident that a single rack plate suitably situated could alternatively be used. Moreover, the rack plate could alternatively be pivoted to the hinge plate and the locking pins mounted on the seat frame.

Again the seat height adjustment mechanism at the front of the seat could be replaced by one in accordance with or similar to the rear seat height adjustment mechanism described above.

Other modifications within the scope of the invention will be apparent to those skilled in the art.

I claim:

1. A vehicle seat comprising,
  a seat frame,
  a seat cushion frame,
  two cushion-height adjustment mechanisms mounted on the seat frame at the front and back of the seat respectively and supporting the front and back of the seat cushion frame for independent movement upwards and downwards with respect to the seat frame,
  one of said height adjustment mechanisms comprising hinge means pivoted to the seat frame and to the seat cushion frame respectively on horizontally-spaced parallel pivots extending laterally of the seat, to allow the cushion frame to be raised or lowered pivotally,
  a spring mounted on the seat frame and biassing the hinge means upwardly,
  two co-operating locking means comprising a pin, and a rack having teeth spaced apart vertically to receive the pin therebetween in vertically downward load-supporting relationship,
  means mounting one of said locking means on the seat frame,
  means mounting the other of said locking means on the hinge means and cushion frame assembly,
  one of the mounting means being a pivot on which the associated locking means is supported, and
  biassing means acting on the pivotally supporting locking means to urge the two locking means into mutual engagement.

2. A vehicle seat according to claim 1 wherein said hinge means comprise a plate hinged along its forward and rearward edges to the seat cushion frame and to the seat frame respectively.

3. A vehicle seat according to claim 1 wherein said rack is formed by a plate having a generally vertically extending main slot therein and a plurality of laterally-extending vertically-spaced branch slots defining between them the teeth of the rack.

4. A vehicle seat according to claim 3 wherein the rack is pivoted adjacent one end thereof to the seat frame, and the pin is fixed to the hinge means.

5. A vehicle seat according to claim 4 having a handle connected to the rack for rotating the rack out of engagement with the pin.

6. A vehicle seat comprising,
  a seat frame
  a seat cushion frame
  two seat height adjustment mechanisms mounted on the seat frame at the front and back of the seat respectively and supporting the front and back of the seat cushion frame for independent movement upwards and downwards with respect to the seat frame, the height adjustment mechanism at the back of the seat comprising, a hinge plate hinged along its forward edge to the rearward edge of the seat cushion frame, and hinged along its rearward edge to the seat frame to permit upward and downward movement of the rearward end of the seat cushion frame, a spring acting between the seat frame and the hinge plate to bias the forward edge of the hinge plate upwardly, a pin mounted on the hinge plate, a rack pivoted to the seat frame and biassed into engagement with the pin, the rack comprising a plate having a main upwardly directed slot and a plurality of vertically spaced branch slots extending from and inclined upwardly from the main slot to receive the pin therein, and means biassing the rack in a sense to urge the pin and the selected one of the branch slots into mutual engagement, and a handle connected to the rack for movement of the rack out of engagement with the pin to release the rearward end of the seat cushion frame for upward or downward movement.

* * * * *